(12) United States Patent
Suh et al.

(10) Patent No.: US 9,407,849 B2
(45) Date of Patent: Aug. 2, 2016

(54) IMAGE SENSOR AND SYSTEM INCLUDING THE SAME

(71) Applicant: Samsung Electronics Co., Ltd., Suwon-Si, Gyeonggi-Do (KR)

(72) Inventors: Sung Ho Suh, Hwaseong-si (KR); Yu Jin Park, Seoul (KR); Jin Ho Seo, Seoul (KR); Kwi Sung Yoo, Seoul (KR); Seung Hyun Lim, Yongin-si (KR); Seog Heon Ham, Suwon-si (KR); Kyoung Min Koh, Hwaseong-si (KR); Han Yang, Yongin-si (KR); Jae Cheol Yun, Seoul (KR); Yong Lim, Hwaseong-si (KR); Jae Jin Jung, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 324 days.

(21) Appl. No.: 14/084,705

(22) Filed: Nov. 20, 2013

(65) Prior Publication Data

US 2014/0145067 A1    May 29, 2014

(30) Foreign Application Priority Data

Nov. 27, 2012    (KR) .................. 10-2012-0135263

(51) Int. Cl.
*H01J 40/14*    (2006.01)
*H04N 5/378*   (2011.01)
*H04N 5/374*   (2011.01)

(52) U.S. Cl.
CPC ............. *H04N 5/378* (2013.01); *H04N 5/3742* (2013.01)

(58) Field of Classification Search
CPC ....... H04N 5/335; H04N 5/376; H04N 5/378; H04N 5/3745
USPC .......... 250/208.1, 214 R; 348/302, 303, 304, 348/320, 322
See application file for complete search history.

(56) References Cited

U.S. PATENT DOCUMENTS

2010/0271523 A1* 10/2010 Hara ..................... H04N 5/367
                                                        348/302
2011/0221941 A1    9/2011 Sato

OTHER PUBLICATIONS

Toyama et al. A 17.7Mpixel 120fps CMOS Image Sensor with 34.8Gb/s Readout, 2011 IEEE International Solid-State Circuits Conference, Digest of Technical Papers.

* cited by examiner

*Primary Examiner* — Kevin Pyo
(74) *Attorney, Agent, or Firm* — Harness, Dickey & Pierce, P.L.C.

(57) ABSTRACT

An image sensor includes a first column pair and a second column pair among a plurality of columns of a pixel array, an analog-to-digital converter pair, and a switch arrangement circuit configured to connect the first column pair with the analog-to-digital converter pair in response to first switch control signals such that two rows among a plurality of rows in the pixel array are read during a single access time.

20 Claims, 10 Drawing Sheets

IMAGE1  IMAGE2  IMAGE3

IMAGE SENSOR AND SYSTEM INCLUDING THE SAME

CROSS-REFERENCE TO RELATED APPLICATIONS

This application claims priority under 35 U.S.C. §119(a) from Korean Patent Application No. 10-2012-0135263 filed on Nov. 27, 2012, the disclosure of which is hereby incorporated by reference in its entirety.

BACKGROUND

Example embodiments relate to an image sensor, and a system including the same.

An image sensor is a device converting an optical image signal into an electrical image signal. The image sensor may perform image sensing at high resolution by skipping reading during a single access time to increase an output speed. Here, the image sensor does not use all analog-to-digital converters.

SUMMARY

An example embodiment of the present inventive concepts is directed to an image sensor including a first column pair and a second column pair among a plurality of columns of a pixel array, an analog-to-digital converter pair, and a switch arrangement circuit connecting the first column pair with the analog-to-digital converter pair in response to first switch control signals such that two rows among a plurality of rows in the pixel array are read during a single access time.

According to an example embodiment, the switch arrangement circuit may include a first capacitor pair corresponding to the first column pair, a second capacitor pair corresponding to the second column pair, and a switch arrangement which is controlled so that the first capacitor may share a charge and the second capacitor pair may share a charge in response to the first switch control signals.

According to another example embodiment, the switch arrangement circuit may include a first capacitor corresponding to the first column pair, a second capacitor corresponding to the second column pair, and a switch arrangement which is controlled so that one of the first column pair may be connected to the first capacitor and the other of the first column pair may be connected to the second capacitor in response to the first switch control signals.

According to still another example embodiment, the switch arrangement circuit may connect one of the first column pair with one of the second column pair, and simultaneously connect the other of the first column pair with the other of the second column pair in response to second switch control signals.

According to still another example embodiment, the switch arrangement circuit may include a first capacitor pair corresponding to the first column pair, a second capacitor pair corresponding to the second column pair, and a switch arrangement which is controlled so that one of the first column pair and one of the second column pair may be connected with each other in series through the first capacitor pair, and the other of the first column pair and the other of the second column pair may be connected with each other in series through the second capacitor pair in response to the second switch control signals.

According to still another example embodiment, the switch arrangement circuit may include a first capacitor corresponding to the first column pair, a second capacitor corresponding to the second column pair, and a switch arrangement which is controlled so that one of the first column pair and one of the second column pair may be connected with one of the analog-to-digital converter pair through the first capacitor, and the other of the first column pair and the other of the second column pair may be connected with the other of the analog-to-digital converter pair through the second capacitor in response to the second switch control signals.

The image sensor further includes a ramp signal generator generating a first ramp signal and a second ramp signal, and one of the analog-to-digital converter pair may generate a first digital signal based on the first ramp signal and a signal output from the switch arrangement circuit, and the other of the analog-to-digital converter pair may generate a second digital signal based on the second ramp signal and a signal output from the switch arrangement circuit.

There may be a difference in level as much as an offset between the first ramp signal and the second ramp signal in a sampling section.

Variation with time in a level of the first ramp signal may be different from variation with time in a level of the second ramp signal in the sampling section.

An example embodiment of the present inventive concepts is directed to an image sensing system, including an image sensor and a processor controlling an operation of the image sensor.

The image sensor may include a pixel array including a plurality of rows and a plurality of columns, a first column pair and a second column pair among the plurality of columns, and a switch arrangement circuit connecting the first column pair with the analog-to-digital converter pair in response to first switch control signals, and the image sensor may read two rows of the plurality of rows.

According to an example embodiment, the switch arrangement circuit may include a first capacitor pair corresponding to the first column pair, a second capacitor pair corresponding to the second column pair, and a switch arrangement which is controlled so that the first column pair may share a charge with each other and the second column pair may share a charge with each other in response to the first switch control signals.

According to another example embodiment, the switch arrangement circuit may include a first capacitor corresponding to the first column pair, a second capacitor corresponding to the second column pair, and a switch arrangement which is controlled so that one of the first column pair may be connected to the first capacitor and the other of the first column pair may be connected to the second capacitor in response to the first switch control signals.

According to still another example embodiment, the switch arrangement circuit may connect one of the first column pair with one of the second column pair, and simultaneously connect the other of the first column pair with the other of the second column pair in response to second switch control signals.

According to still another example embodiment, the switch arrangement circuit may include a first capacitor pair corresponding to the first column pair, a second capacitor pair corresponding to the second column pair, and a switch arrangement which is controlled so that one of the first column pair and one of the second column pair may be connected with each other in series through the first capacitor pair, and the other of the first column pair and the other of the second column pair may be connected with each other in series through the second capacitor pair in response to the second switch control signals.

According to still another example embodiment, the switch arrangement circuit may include a first capacitor corresponding to the first column pair, a second capacitor corresponding to the second column pair, and a switch arrangement which is controlled so that one of the first column pair and one of the second column pair may be connected with one of the analog-to-digital converter pair through the first capacitor, and the other of the first column pair and the other of the second column pair may be connected with the other of the analog-to-digital converter pair through the second capacitor in response to the second switch control signals.

At least one example embodiment relates to image sensor.

In one embodiment, the image sensor includes a column driver configured to connect pairs of column lines to analog-to-digital converters in response to switch control signals; and a pixel array configured to supply each column line of the pairs of column lines with pixel signals from at least two rows simultaneously in response to row selection signals.

In one embodiment, the column driver includes first and second pairs of capacitors connected between the column lines and the analog-to-digital converters.

In one embodiment, in response to first switch control signals, the column driver is further configured to, connect the first pair of capacitors to a first column line of a first pair of the pairs of column lines such that the first pair of capacitors share a charge therebetween; and connect the second pair of capacitors to a second column line of the first pair of column lines such that the second pair of capacitors share a charge therebetween.

In one embodiment, in response to second switch control signals, the column driver is further configured to generate a mixing signal by, connecting a first column line of a first pair of the pairs of column lines with a first column line of a second pair of the pairs of column lines in series through the first pair of capacitors; and connecting a second column line of the first pair of column lines with a second column line of the second pair of column lines in series through the second pair of capacitors.

In one embodiment a first one of the analog-to-digital converters is configured to generate a first digital signal based on a first ramp signal and the mixing signal; and a second one of the analog-to-digital converters is configured to generate a second digital signal based on a second ramp signal and the mixing signal, wherein a variation in the first ramp signal over a sampling period differs from a variation in the second ramp signal over the sampling period.

DETAILED DESCRIPTION OF THE EMBODIMENTS

Figure 1:
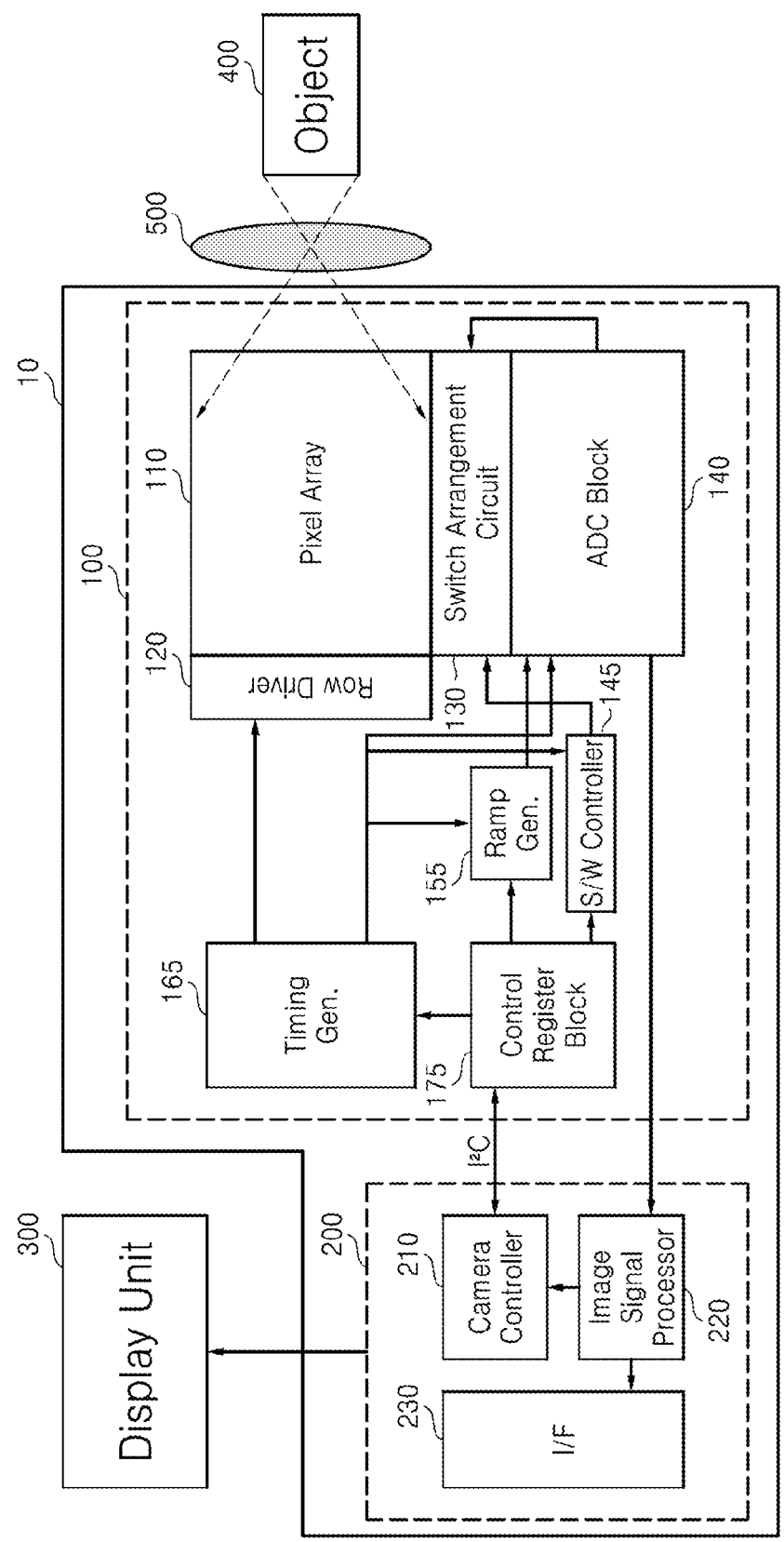
FIG. 1 is a schematic block diagram of an image sensing system including an image sensor according to an example embodiment of the present inventive concepts.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a schematic block diagram of an image sensing system including an image sensor according to an example embodiment of the present inventive concepts.

Referring to FIG. 1, an image sensing system 10 includes an image sensor 100 and a digital signal processor 200.

The image sensing system 10 may be used in a digital camera or a digital camera-equipped portable device. The image sensing system 10 may sense an object 400 or an image of the object 400 input through a lens 500 according to a control of a processor, e.g., the digital signal processor 200.

The digital signal processor 200 may generate an image by processing an image signal which is sensed and output by the image sensor 100, and output the generated image to a display unit 300. The display unit 300 may include all devices capable of displaying an image. For example, the display unit 300 may include a display of a computer or a portable device.

The digital signal processor 200 includes a camera controller 210, an image signal processor 220, and an interface 230.

The camera controller 210 may control a control register block 175. The camera controller 210 may control the image sensor 100, i.e., the control register block 175, by using an inter-integrated circuit (I²C); however, example embodiments are not restricted thereto.

The image signal processor 220 may receive an image signal converted by an analog-to-digital converter block 140, generate an image based on the converted image signal, and output the generated image to the display unit 300 through an interface 230.

FIG. 1 illustrates that the image signal processor 220 is located inside the digital signal processor 200 in FIG. 1; however, for example, the image signal processor 220 may be embodied inside the image sensor 100.

The image sensor 100 may include a pixel array 110, a row driver 120, a switch arrangement circuit 130, an analog-to-digital converter block 140, a switch controller 145, a ramp signal generator 155, a timing generator 165, and a control register block 175.

The pixel array 110 may include a plurality of pixels in which a plurality of rows and columns are arranged in a matrix form. Each of the plurality of pixels may include a plurality of transistors and a photo sensitive element, e.g., a photo diode or a pinned photo diode.

Each of the plurality of pixels may further include a color filter. For example, the color filter may be a red filter passing light in a red wavelength region, a green filter passing light in a green wavelength region, or a blue filter passing light in a blue wavelength region.

According to an example embodiment, the color filter may be a cyan filter, a magenta filter, or a yellow filter. Each of the plurality of pixels may sense light using the photo sensitive element, and generate an image signal, e.g., a pixel signal, by converting the sensed light into an electrical signal.

The timing generator 165 may control each operation of the row driver 120, the analog-to-digital block 140, and the ramp signal generator 155 by outputting a corresponding control signal to each of the row driver 120, the analog-to-digital block 140, and the ramp signal generator 155.

The control register block 175 may control an operation of each element 145, 155, 165, and 140 by outputting a corresponding control signal to each of the switch controller 145, the ramp signal generator 155, the timing generator 165, and the analog-to-digital block 140. The control register block 175 may operate according to a control of the camera controller 210.

The row driver 120 may drive the pixel array 110 on a row basis during a single access time. For example, the row driver 120 may generate a row selection signal. That is, the row driver 120 may decode a row control signal, e.g., a row address signal, generated by the timing generator 165, and select, at a same time, at least one of a plurality of rows composing the pixel array 110 in response to the decoded row control signal The pixel array 110 may output a reset signal and/or a pixel signal from a row, selected by a row selection signal provided from the row driver 120, to the switch arrangement circuit 130.

The switch arrangement circuit 130 may control connection between each of a plurality of columns of the pixel array 110 and the analog-to-digital converter block 140 in response to control signals, e.g., switch control signals, output from the analog-to-digital converter block 140.

That is, the switch arrangement circuit 130 controls connection between each of the plurality of columns of the pixel array 110 and the analog-to-digital converter block 140, so that pixel signals output from the pixel array 110 may be transmitted to the analog-to-digital converter block 140.

In addition, the switch arrangement circuit 130 may receive a reset signal and a pixel signal from the pixel array 110, and perform correlated double sampling on the received reset signal and pixel signal.

The analog-to-digital converter block 140 may control an operation of the switch arrangement circuit 130 by outputting control signals, e.g., switch control signals, to the switch arrangement circuit 130 in response to a control signal output from the timing generator 165.

In addition, the analog-to-digital converter block 140 may convert pixel signals transmitted from the switch arrangement circuit 130 into digital signals by using a ramp signal output from the ramp signal generator 155, and output the converted digital signals to the digital signal processor 200, e.g., the image signal processor 220.

Figure 2:
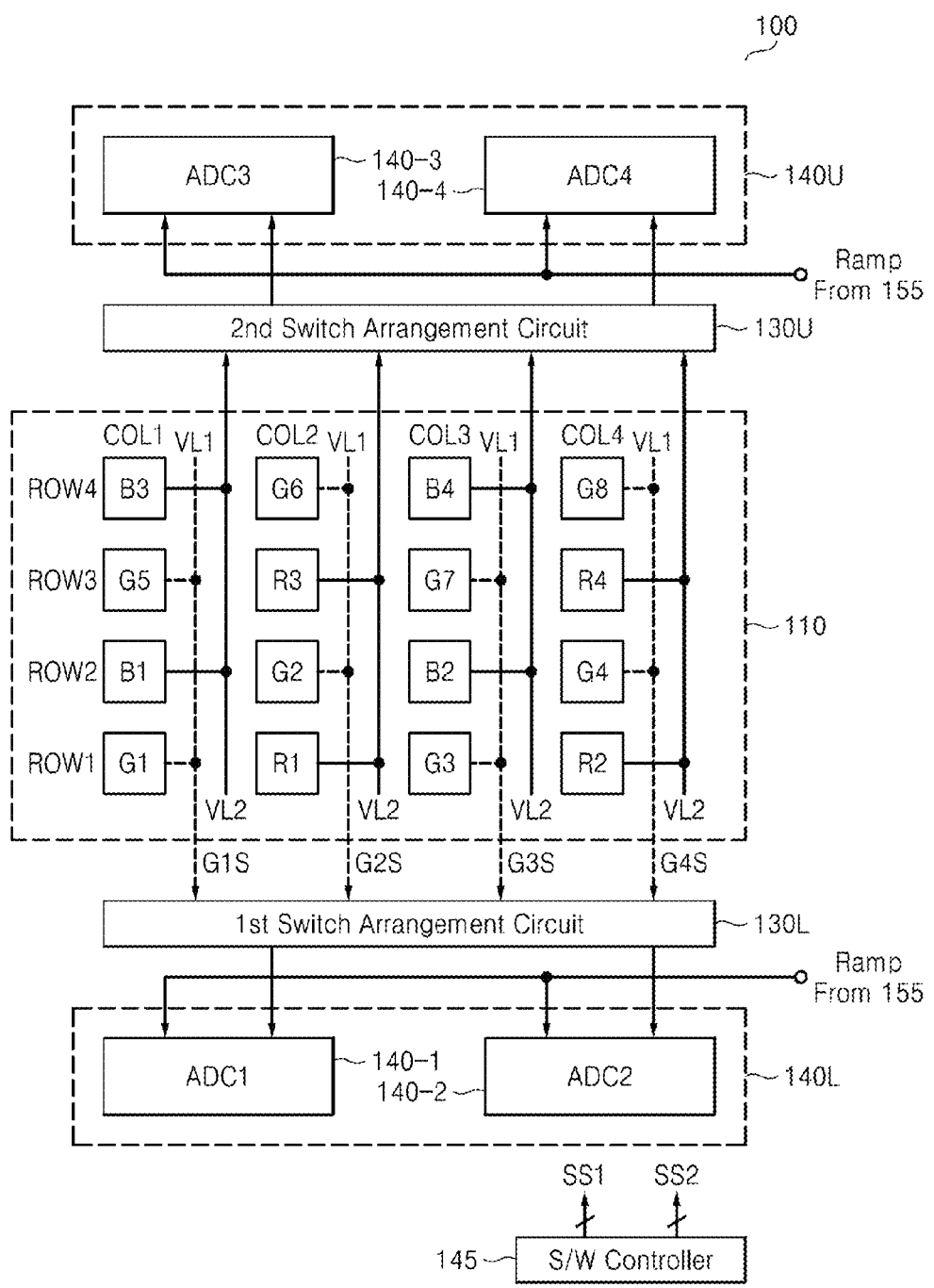
FIG. 2 is a block diagram more specifically depicting the image sensor according to an example embodiment of the present inventive concepts.

FIG. 2 is a block diagram more specifically depicting an image sensor according to an example embodiment of the present inventive concepts.

Referring to FIGS. 1 and 2, the switch arrangement circuit 130 and the analog-to-digital converter block 140 according to an example embodiment of the present inventive concepts may be symmetrically disposed centered on the pixel array 110 as illustrated in FIG. 2, respectively.

The pixel array 110 illustrated in FIG. 2 indicates a first row ROW1 to a fourth row ROW4 only among a plurality of rows, and indicates pixels only from a first column COL1 to a fourth column COL4 in each row ROW1 to ROW4 among a plurality of columns for convenience of explanation, however, example embodiments are not limited thereto.

The pixel array 110 may include two column lines, i.e., a first column line VL1 and a second column line VL2, for each column COL1 to COL4. All pixels of each column COL1 to COL4 may be coupled with a first column line VL1 and a second column line VL2 without redundant connection.

More specifically, a group of pixels G1 and G5 among a plurality of pixels G1, B1, G5 and B3 of a first column COL1 may be coupled with the first column line VL1, and a group of pixels B1 and B3 among the plurality of pixels G1, B1, G5, and B3 of the first column COL1 may be coupled with the second column line VL2.

A group of pixels G2 and G6 among a plurality of pixels G2, R1, G6 and R3 of a second column COL2 may be coupled with the first column line VL1, and a group of pixels R1 and R3 among the plurality of pixels G2, R1, G6 and R3 of the second column COL2 may be coupled with the second column line VL2.

A group of pixels G3 and G7 among a plurality of pixels G3, B2, G7, and B4 of a third column COL3 may be coupled with the first column line VL1, and a group of pixels B2 and B4 among the plurality of pixels G3, B2, G7, and B4 of the third column COL3 may be coupled with the second column line VL2.

A group of pixels G4 and G8 among a plurality of pixels G4, R2, G8, and R4 of a fourth column COL4 may be coupled with the first column line VL1, and a group of pixels R2 and R4 among the plurality of pixels G4, R2, G8, and R4 may be coupled with the second column line VL2.

However, the image sensor 100 is not restricted to the number of column lines coupled with each column COL1 to COL4. Even when there are two or more column lines corresponding to each column COL1 to COL4, a plurality of pixels included in each column COL1 to COL4 are divided into groups to be appropriate for the number of column lines corresponding to each column, and each pixel may be coupled with one of the column lines according to the divided group.

According to an example embodiment, a plurality of pixels of each column COL1 to COL4 may be connected to one of the first column line VL1 and the second column line VL2 in a fixed pattern. For example, the fixed pattern may be that each pixel having the same color among a plurality of pixels of each column COL1 to COL4 is coupled with the same column line VL1 or VL2.

A first analog-to-digital converter block 140L located at a lower part of the pixel array 110 may include a plurality of analog-to-digital converters 140-1 and 140-2, and a second analog-to-digital converter block 140U located at an upper part of the pixel array 110 may include a plurality of analog-to-digital converters 140-3 and 140-4.

Each analog-to-digital converter 140-1 to 140-4 may correspond to a column pair, e.g., two columns, among a plurality of columns COL1 to COL4. More specifically, the first analog-to-digital converter 140-1 may correspond to a first column pair COL1 and COL2 through a first column line VL1 of each of the first column COL1 and the second column COL2.

A second analog-to-digital converter 140-2 may correspond to a second column pair COL3 and COL4 through a first column line VL1 of each of a third column COL3 and a fourth column COL4.

A third analog-to-digital converter 140-3 may correspond to the first column pair COL1 and COL2 through a second column line VL2 of each of the first column COL1 and the second column COL2.

A fourth analog-to-digital converter 140-4 may correspond to the second column pair COL3 and COL4 through a second column line VL2 of each of the third column COL3 and the fourth column COL4.

That is, the first column line VL1 of each column COL1 to COL4 may be connected to a first switch arrangement circuit 130L located at a lower part of the pixel array 110, and the second column line VL2 of each column COL1 to COL4 may be connected to a second switch arrangement circuit 130U located at a upper part of the pixel array 110.

Accordingly, each switch arrangement circuit 130U and 130L may control connection between a column pair, e.g., a first column pair COL1 and COL2 and/or a second column pair COL3 and COL4, among the plurality of columns COL1 to COL4 of the pixel array 110 and each analog-to-digital converter 140-1 to 140-4.

Each switch arrangement circuit 130U and 130L and each analog-to-digital converter 140U to 140L are symmetrically disposed centered on the pixel array 110 as illustrated in FIG. 2, and perform substantially the same operation. Accordingly, for the sake of brevity a first switch arrangement circuit 130L and a first analog-to-digital converter block 140L, which are located at a lower part of the pixel array 110, are only described.

The row driver 120 may generate row selection signals, and output the generated row selection signals to the pixel array 110.

In addition, the pixel array 110 may read simultaneously or sequentially two rows, selected by the generated row selection signals output from the row driver 120 during single access time, e.g., output a plurality of pixel signals from the two rows to the first switch arrangement circuit 130L.

The first switch arrangement circuit 130L may connect a first column pair COL1 and COL2 among the plurality of columns COL1 to COL4 with a first analog-to-digital converter pair 140-1 and 140-2 in response to first switch control signals SS1.

The first analog-to-digital converter pair 140-1 and 140-2 may convert pixel signals output from the first column pair COL1 and COL2 into digital signals. In addition, the first switch arrangement circuit 130L may connect one of the first column pair COL1 and COL2 with one of the second column pair COL3 and COL4, and simultaneously connect the other of the first column pair COL1 and COL2 with the other of the second column pair COL3 and COL4 in response to second switch control signals SS2.

The first analog-to-digital converter pair 140-1 and 140-2 may convert the pixel signals into digital signals based on pixel signals output from the first column pair COL1 and COL2 and the second column pair COL3 and COL4.

The first switch control signals SS1 and the second switch control signals SS2 may be generated by a switch controller 145. The switch controller 145 may control an operation of each analog-to-digital converter 140-1 to 140-4.

According to an example embodiment, the first switch control signals SS1 and the second switch control signals SS2 may be generated by the timing generator 165.

Since each column pair corresponds to each analog-to-digital converter 140-1 to 140-4 located at the upper part and the lower part, the image sensor 100 according to an example embodiment of the present inventive concepts may minimize an increase in the size of a readout circuit, e.g., the analog-to-digital converter block 140, in the image sensor 100, and simultaneously read a plurality of pixel signals from two rows.

Figure 3:
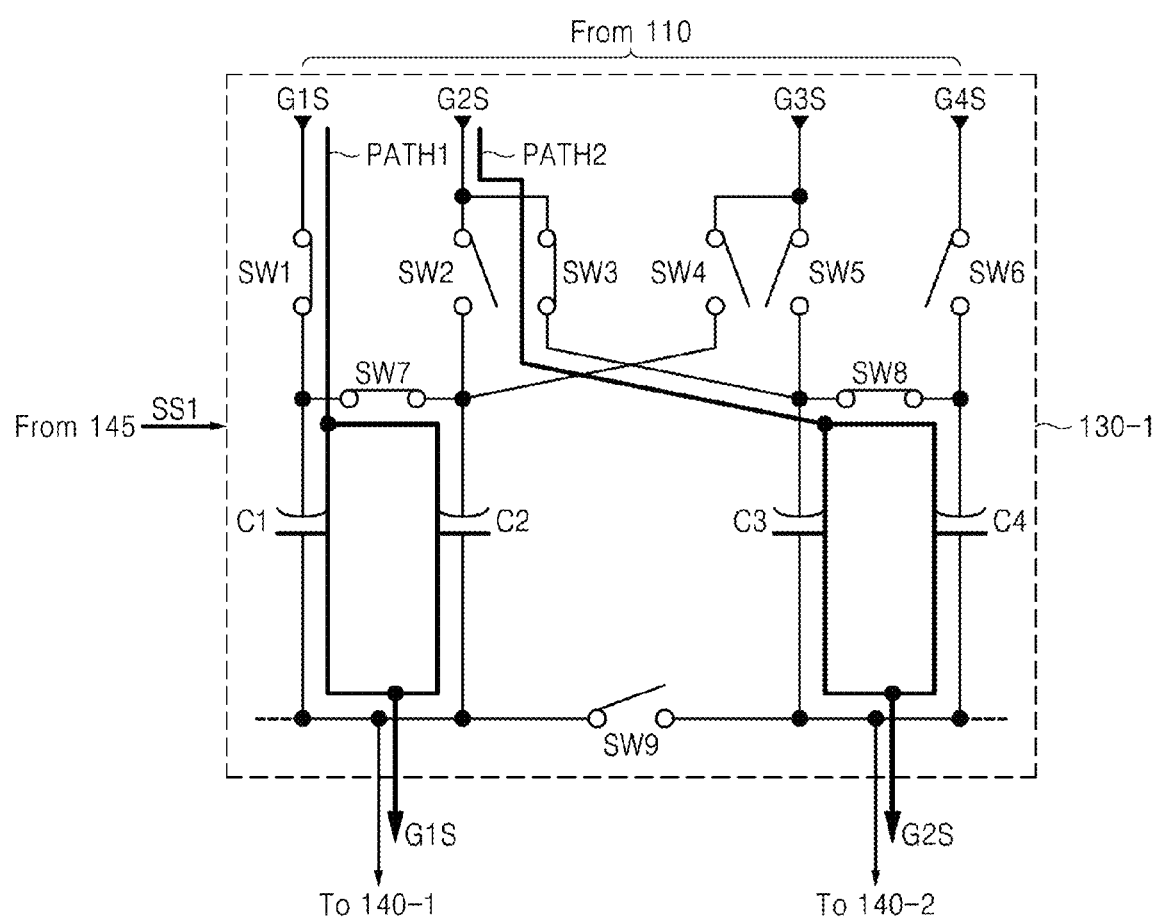
FIG. 3 is a circuit diagram for describing an example embodiment of a method for operating a switch arrangement circuit according to an example embodiment of the present inventive concepts.

FIG. 3 is a circuit diagram for describing an example embodiment of a method for operating a switch arrangement circuit according to an example embodiment of the present inventive concepts.

Referring to FIGS. 1 to 3, a switch arrangement circuit 130-1 illustrated in FIG. 3 is coupled with odd numbered columns COL1 and COL3 in a first row ROW1 and even numbered columns COL2 and COL4 in a second row ROW2 illustrated in FIG. 2. The switch arrangement circuit 130-1 illustrated in FIG. 3 depicts an example embodiment of the switch arrangement circuit 130 illustrated in FIGS. 1 and 2.

The pixel array 110 may read two rows, e.g., the first row ROW1 and the second row ROW2, among a plurality of rows ROW1 to ROW4 during single access time in response to row selection signals output from the row driver 120.

The pixel array 110 may output both a first pixel signal G1S and a third pixel signal G3S, which are generated from a first pixel G1 and a third pixel G3, respectively, in the first row ROW1, to the switch arrangement circuit 130-1.

In addition, the pixel array 110 may output both a second pixel signal G2S and a fourth pixel signal G4S, which are generated at a second pixel G2 and a fourth pixel G4, respectively, in the second row ROW2, simultaneously to the switch arrangement circuit 130-1.

The switch arrangement circuit 130-1 includes a first capacitor pair C1 and C2, a second capacitor pair C3 and C4, and a switch arrangement SW1 to SW9. The switch arrangement circuit 130-1 may connect the first column pair COL1 and COL2 among the plurality of columns COL1 to COL4 to the first analog-to-digital converter pair 140-1 and 140-2 in response to the first switch control signals SS1.

The first capacitor pair C1 and C2 may correspond to the first column pair COL1 and COL2. The second capacitor pair C3 and C4 may correspond to the second column pair COL3 and COL4.

In response to the first switch control signals SS1, a switch arrangement SW1 to SW9 may be controlled so that the first capacitor pair C1 and C2 may share a charge of a pixel signal output from one of the first column pair COL1 and COL2, and the second capacitor pair C3 and C4 may share a charge of a pixel signal output from the other of the first column pair COL1 and COL2.

More specifically, as illustrated in FIG. 3, in response to each of the first switch control signals SS1, when each switch SW2, SW4. SW5, SW6, and SW9 is turned off, and each switch SW1, SW3, SW7, and SW8 is turned on, the first pixel signal G1S output from the first pixel G1 of the first column COL1 may be transmitted to the first analog-to-digital converter 140-1 through a first path PATH1, and the second pixel signal G2S output from the second pixel G2 of the second column COL2 may be transmitted to the second analog-to-digital converter 140-2 through a second path PATH2.

Each analog-to-digital converter 140-1 and 140-2 may convert each of the first pixel signal G1S and the second pixel signal G2S into a digital signal and output the result.

Accordingly, the image sensor 100 outputs each of the pixel signals G1S and G2S output from two rows ROW1 and ROW2 among a plurality of rows ROW1 to ROW4 to each of the plurality of analog-to-digital converters 140-1 and 140-2, and thereby increasing a frame rate.

Figure 4:
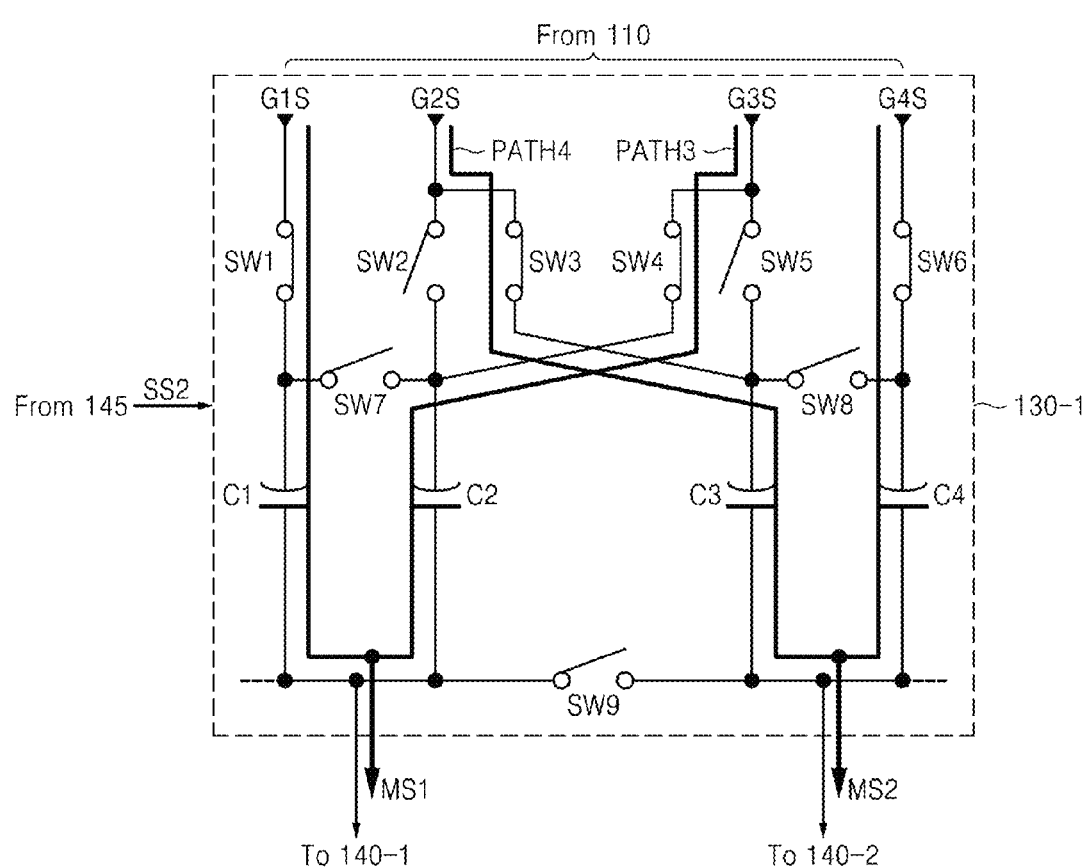
FIG. 4 is a circuit diagram for describing another example embodiment of the method for operating a switch arrangement circuit according to an example embodiment of the present inventive concepts.

FIG. 4 is a circuit diagram for describing another example embodiment of the method for operating a switch arrangement circuit according to an example embodiment of the present inventive concepts.

Referring to FIGS. 1 to 4, the switch arrangement circuit 130-1 may connect one of the first column pair COL1 and COL2 with one of the second column pair COL3 and COL4, and simultaneously connect the other of the first column pair COL1 and COL2 with the other of the second column pair COL3 and COL4 in response to second switch control signals SS2.

In response to the second switch control signals SS2, the switch arrangement SW1 to SW9 may be controlled so that one of the first column pair COL1 and COL2 and one of the second column pair COL3 and COL4 may be connected in series through a first capacitor pair C1 and C2, and the other of the first column pair COL1 and COL2 and the other of the second column pair COL3 and COL4 may be connected in series through the second capacitor pair C3 and C4.

More specifically, in response to each of the second switch control signals SS2, when each switch SW2, SW5, SW7, SW8, an SW9 is turned off, and each switch SW1, SW3, SW4 and SW6 is turned on, pixel signals G1S and G3S of the odd numbered columns COL1 and COL3 may be transmitted through a third path PATH3, and pixel signals G2S and G4S of the even numbered columns COL2 and COL4 may be transmitted through a fourth path PATH4.

That is, the switch arrangement circuit 130-1 may generate a first mixing signal MS1 using the first pixel signal G1S and the third pixel signal G3S stored in the first capacitor pair C1 and C2, and generate a second mixing signal MS2 using the second pixel signal G2S and the fourth pixel signal G4S stored in the second capacitor pair C3 and C4.

The switch arrangement circuit 130-1 may generate noise-reduced mixing signals MS1 and MS2 by using the first capacitor pair C1 and C2 and the second capacitor pair C3 and C4.

Each analog-to-digital converter 140-1 and 140-2 may convert each of the first mixing signal MS1 and the second mixing signal MS2 into a digital signal and output the result.

Accordingly, the image sensor 100 according to an example embodiment of the present inventive concepts generates noise-reduced mixing signals MS1 and MS2 based on pixel signals G1S, G2S, G3S, and G4S output from two rows ROW1 and ROW2 among the plurality of rows ROW1 to ROW4, and outputs each of the generated mixing signals MS1 and MS2 to each of the plurality of analog-to-digital converters 140-1 and 140-2, and thereby increasing a frame rate.

Figure 5:
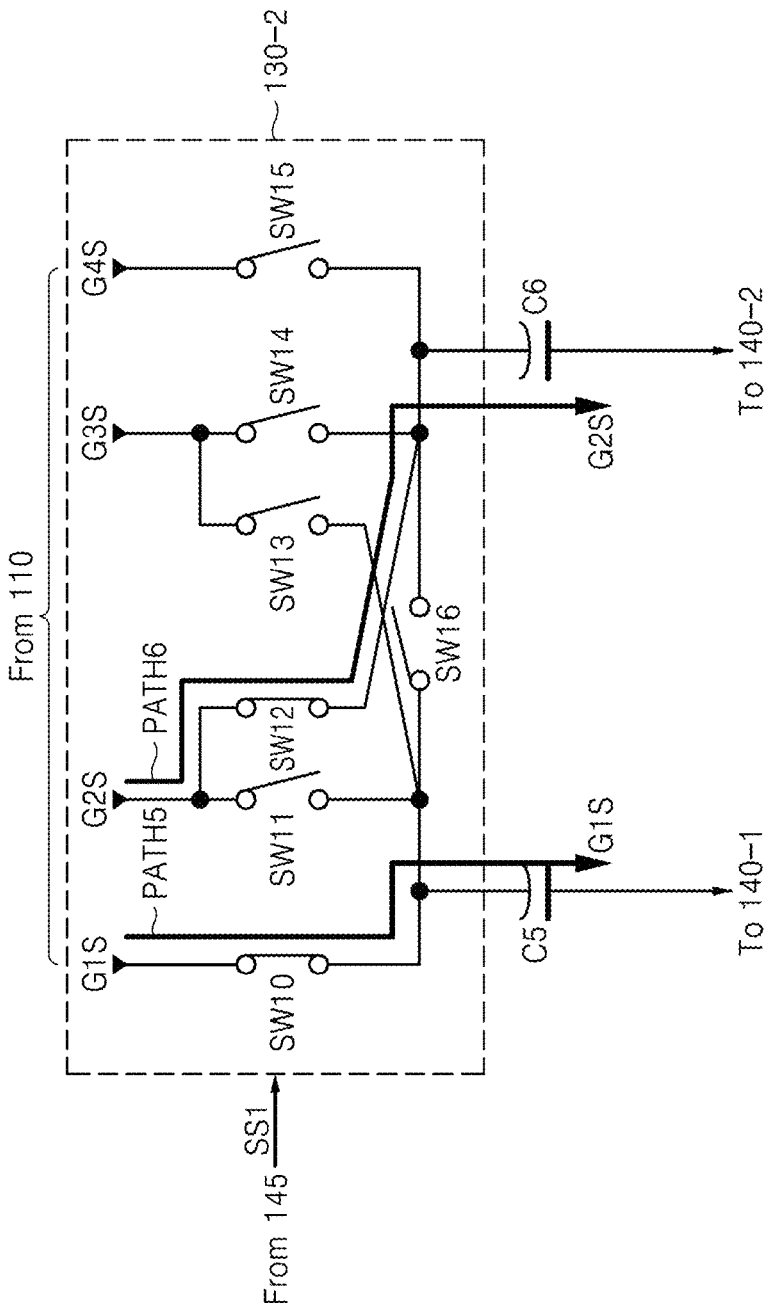
FIG. 5 is a circuit diagram for describing an example embodiment of the method for operating a switch arrangement circuit according to another example embodiment of the present inventive concepts.

FIG. 5 is a circuit diagram for describing an example embodiment of the method for operating a switch arrangement circuit according to another example embodiment of the present inventive concepts.

Referring to FIGS. 1, 2, and 5, the switch arrangement circuit 130-2 illustrated in FIG. 5 is coupled with odd numbered columns COL1 and COL3 in a first row 1ROW and even numbered columns COL2 and COL4 in a second row 2ROW illustrated in FIG. 2. A switch arrangement circuit 130-2 illustrated in FIG. 5 depicts another example embodiment of the switch arrangement circuit 130 illustrated in FIGS. 1 and 2.

The pixel array 110 may read two rows, e.g., the first row 1ROW and the second row 2ROW, among the plurality of rows 1ROW to 4ROW during single access time in response to row selection signals output from the row driver 120.

The pixel array 110 may output the first pixel signal G1S and the third pixel signal G3S generated from a first pixel G1 and a third pixel G3 in the first row 1ROW to the switch arrangement circuit 130-2.

In addition, the pixel array 110 may output a second pixel signal G2S and a fourth pixel signal G4S generated from a second pixel G2 and a fourth pixel G4 in the second row 2ROW to the switch arrangement circuit 130-2 at the same time.

The switch arrangement circuit 130-2 according to an example embodiment of the present inventive concepts includes a first capacitor C5, a second capacitor C6, and a switch arrangement SW10 to SW16.

The switch arrangement circuit 130-2 may connect the first column pair COL1 and COL2 among the plurality of column pairs COL1 to COL4 to the first analog-to-digital converter pair 140-1 and 140-2 in response to the first switch control signals SS1.

The first capacitor C5 may correspond to the first column pair COL1 and COL2. The second capacitor C6 corresponds to the second column pair COL3 and COL4.

In response to the first switch control signals SS1, the switch arrangement SW10 to SW16 may be controlled so that one of the first column pair COL1 and COL2 may be connected to a first capacitor C5 and the other of the first column pair COL1 and COL2 may be connected to a second capacitor C6.

More specifically, as illustrated in FIG. 5, in response to the first switch control signals SS1, when each switch SW11, SW13, SW14, SW15, and SW16 is turned off, and each switch SW10 and SW12 is turned on, the first pixel signal G1S output from the first pixel G1 of the first column COL1 is transmitted to the first analog-to-digital converter 140-1 through a fifth path PATH5, and the second pixel signal G2S output from the second pixel G2 of the second column COL2 may be transmitted to the second analog-to-digital converter 140-2 through a sixth path PATH6.

Each analog-to-digital converter 140-1 and 140-2 may convert each of the first pixel signal G1S and the second pixel signal G2S into a digital signal and output the result.

The image sensor 100 according to an example embodiment of the present inventive concepts outputs each of the pixel signals G1S and G2S output from two rows ROW1 and ROW2 among the plurality of rows ROW1 to ROW4 to each of the plurality of analog-to-digital converters 140-1 and 140-2, and thereby increasing a frame rate.

Figure 6:
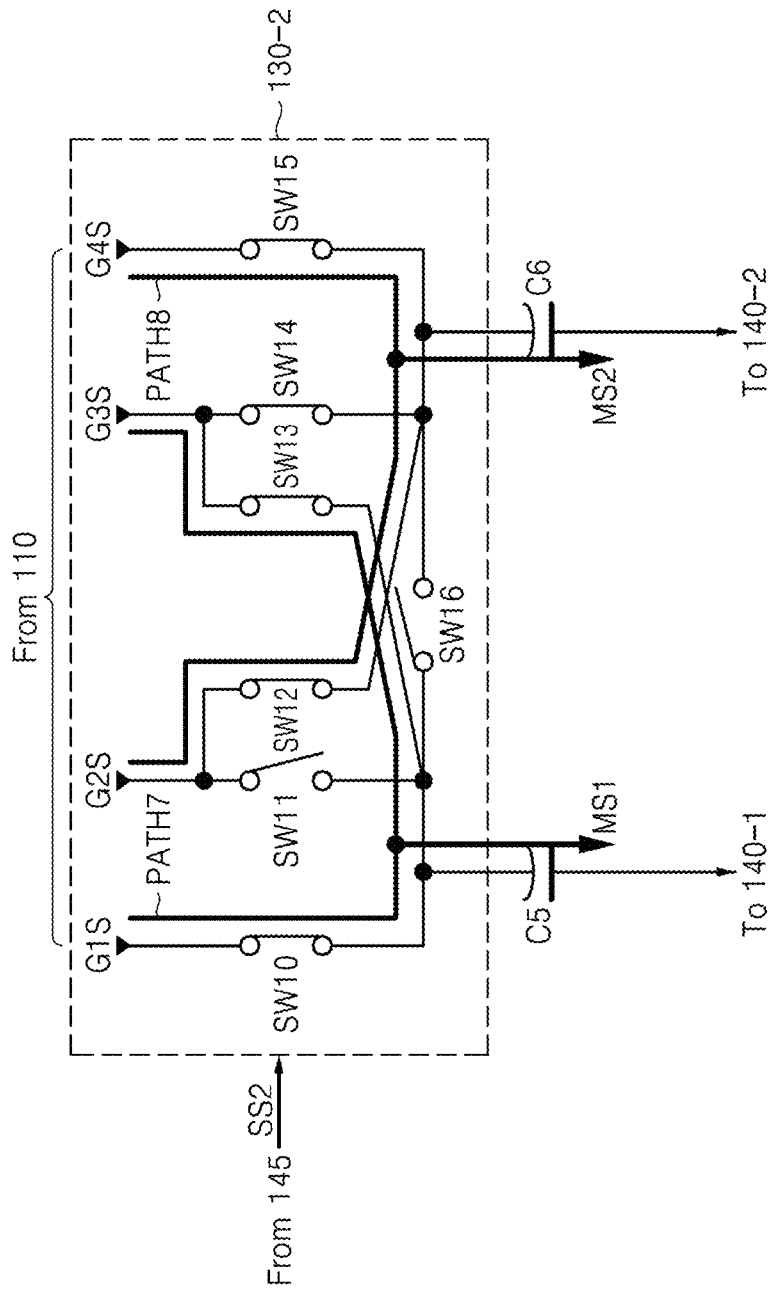
FIG. 6 is a circuit diagram for describing another example embodiment of the method for operating a switch arrangement circuit according to another example embodiment of the present inventive concepts.

FIG. 6 is a circuit diagram for describing another example embodiment of the method for operating a switch arrangement circuit according to another example embodiment of the present inventive concepts.

Referring to FIGS. 1, 2, 5, and 6, the switch arrangement circuit 130-2 may connect one of the first column pair COL1 and COL2 with one of the second column pair COL3 and COL4, and simultaneously connect the other of the first column pair COL1 and COL2 with the other of the second column pair COL3 and COL4 in response to second switch control signals SS2.

In response to the second switch control signals SS2, a switch arrangement SW1 to SW9 may be controlled so that one of the first column pair COL1 and COL2 and one of the second column pair COL3 and COL4 may be connected with one of the first analog-to-digital converter pair 140-1 and 140-2 through the first capacitor C5, and so that the other of the first column pair COL1 and COL2 and the other of the second column pair COL3 and COL4 may be connected with the other of the analog-to-digital converter 140-1 and 140-2 through the second capacitor C6.

More specifically, as illustrated in FIG. 6, in response to the second switch control signals SS2, when each switch SW11, SW14, and SW16 is turned off, and each switch SW10, SW12, SW13, and SW15 is turned on, pixel signals G1S and G3S of the odd numbered columns COL1 and COL3 may be transmitted to the first analog-to-digital converter 140-1 through a seventh path PATH7, and pixel signals G2S and G4S of the even numbered columns COL2 and COL4 may be transmitted to the second analog-to-digital converter 140-2 through an eighth path PATH8.

That is, the switch arrangement circuit 130-2 may generate the first mixing signal MS1 using the first pixel signal G1S and the third pixel signal G3S stored in the first capacitor C5, and generate the second mixing signal MS2 using the second pixel signal G2S and the fourth pixel signal G4S stored in the second capacitor C6.

Accordingly, the switch arrangement circuit 130-2 may generate noise-reduced mixing signals MS1 and MS2 by using the first capacitor C5 and the second capacitor C6.

Each analog-to-digital converter 140-1 and 140-2 may convert each of the first mixing signal MS1 and the second mixing signal MS2 into a digital signal and output the result.

The image sensor 100 according to an example embodiment of the present inventive concepts generates the noise-reduced mixing signals MS1 and MS2 based on pixel signals G1S, G2S, G3S, and G4S output from two rows ROW1 and ROW2 among the plurality of rows ROW1 to ROW4, and outputs each of the generated mixing signals MS1 and MS2 to each of the plurality of analog-to-digital converters 140-1 and 140-2, and thereby increasing a frame rate.

Figure 7:
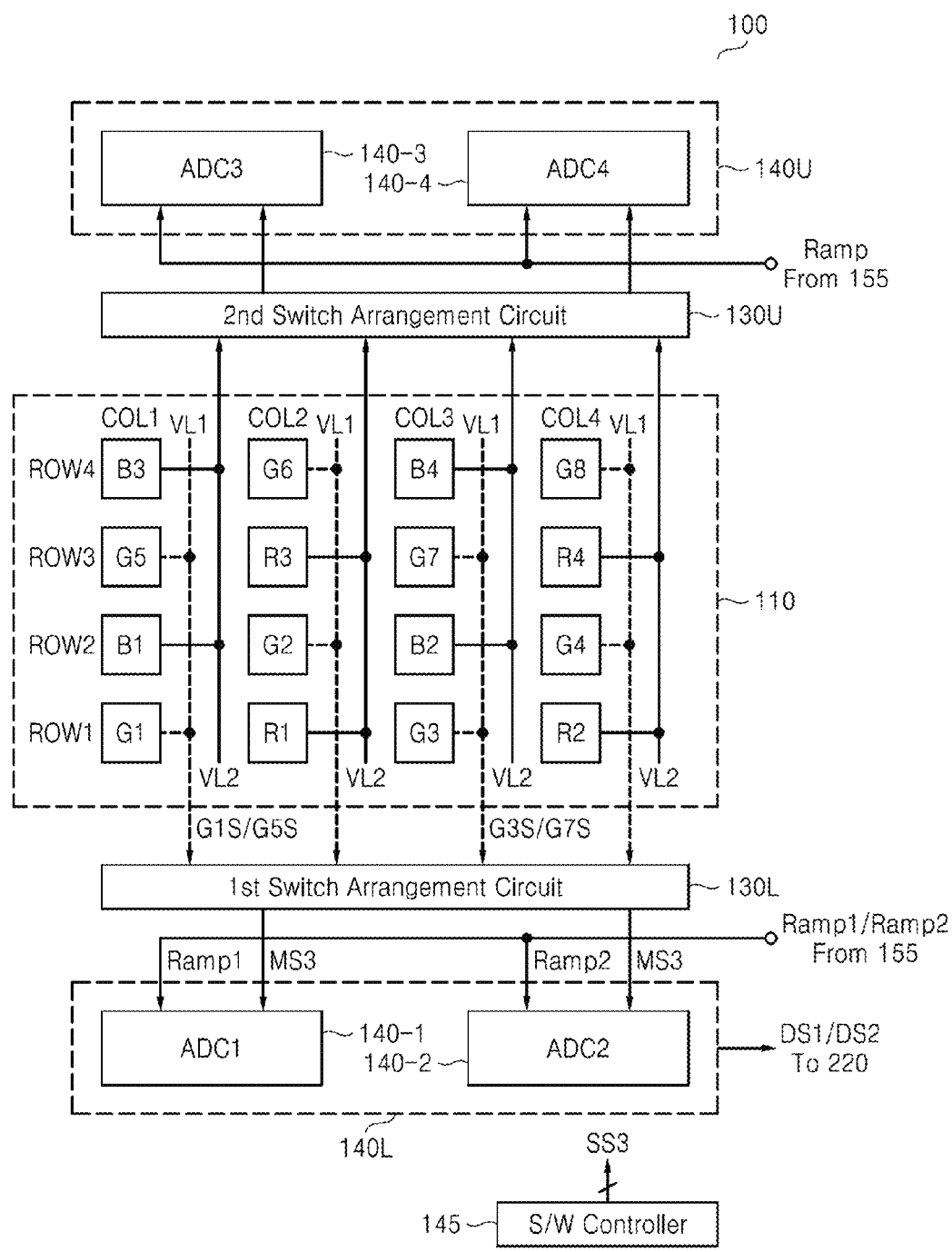
FIG. 7 is a block diagram more specifically depicting the image sensor according to another example embodiment of the present inventive concepts.

FIG. 7 is a block diagram more specifically depicting the image sensor according to another example embodiment of the present inventive concepts.

Referring to FIGS. 1 and 7, each switch arrangement circuit 130U and 130L and each analog-to-digital converter block 140U and 140L are symmetrically disposed centered on the pixel array 110, and perform substantially the same operation. Accordingly, for the sake of brevity only a first switch arrangement circuit 130L and a first analog-to-digital converter block 140L, which are located at a lower part of the pixel array 110, are described.

The row driver 120 may generate row selection signals and output the generated row selection signals to the pixel array 110. In addition, the pixel array 110 may read simultaneously or sequentially two rows ROW1 and ROW3 selected by the generated row selection signals output from the row driver 20 during single access time, e.g., output a plurality of pixel signals G1S, G3S, G5S, and G7S from two rows ROW1 and ROW3 to a first switch arrangement circuit 130L.

The first switch arrangement circuit 130L may connect the first column pair COL1 and COL3 among the plurality of columns COL1 to COL4 with the first analog-to-digital converter pair 140-1 and 140-2 in response to third switch control signals SS3.

According to an example embodiment, the third switch control signals SS3 may be the first switch control signals SS1 illustrated in FIG. 2. Each of the first analog-to-digital converter pair 140-1 and 140-2 may generate each digital signal based on a signal MS3 output from the first switch arrangement circuit 130L and each of the ramp signals RAMP1 and RAMP2.

More specifically, the first switch arrangement circuit 130L may generate a third mixing signal MS3 by using the plurality of pixel signals G1S, G3S, G5S, and G7S output from two rows ROW1 and ROW3. The first switch arrangement circuit 130L may output the third mixing signal MS3 to each analog-to-digital converter 140-1 and 140-2.

Figure 8:
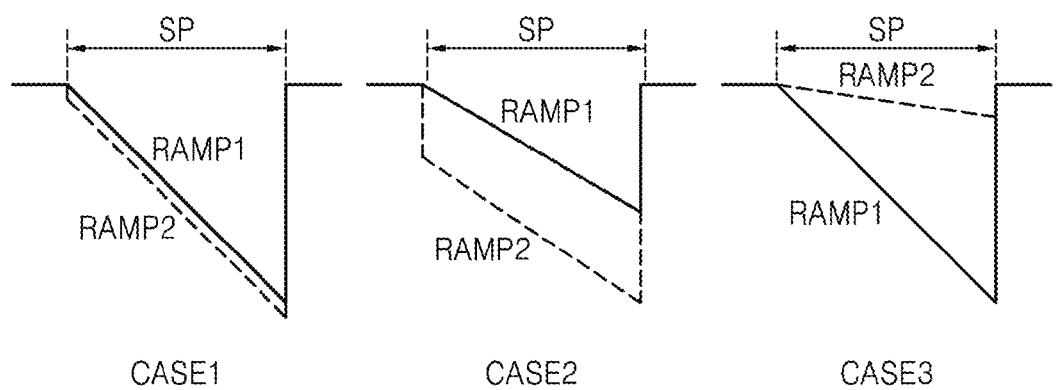
FIG. 8 is a conceptual diagram for describing a method for generating ramp signals illustrated in FIG. 7.

FIG. 8 is a conceptual diagram for describing a method by which a ramp signal generator generates the ramp signals illustrated in FIG. 7.

Referring to FIGS. 1, 7, and 8, a ramp signal generator 155 may generate different ramp signals.

The ramp signal generator 155 may generate a first ramp signal RAMP1 and a second ramp signal RAMP2 that differ from each other during a sampling period PD in respect to at least different cases. There may be a difference in a level as much as an offset between the first ramp signal RAMP1 and the second ramp signal RAMP2 in the sampling period SP. The offset may be one-half times (CASE1) or $2n-1$ times (CASE2) the voltage of a first least signal bit 1LSB, where n may be a bit depth of each analog-to-digital converter 140-1 and 140-2.

Variation with time in a level of the first ramp signal RAMP1 may be different from variation with time in a level of the second ramp signal RAMP2 (CASE3) in the sampling period SP.

The ramp signal generator 155 may output each of the generated ramp signals RAMP1 and RAMP2 to each analog-to-digital converter 140-1 and 140-2. The first analog-to-digital converter 140-1 may generate a first digital signal DS1 based on the third mixing signal MS3 and the first ramp signal RAMP1 output from the ramp signal generator 155.

The second analog-to-digital converter 140-2 may generate a second digital signal DS2 based on the third mixing signal MS3 and the second ramp signal RAMP2 output from the ramp signal generator 155.

That is, each analog-to-digital converter 140-1 and 140-2 may generate the different digital signal DS1 and DS2, respectively, based on the third mixing signal MS3 and a different one of the ramp signals RAMP1 and RAMP2. An image signal processor 220 may generate an image based on digital signals DS1 and DS2 output from the first analog-to-digital converter block 140L.

Figure 9:
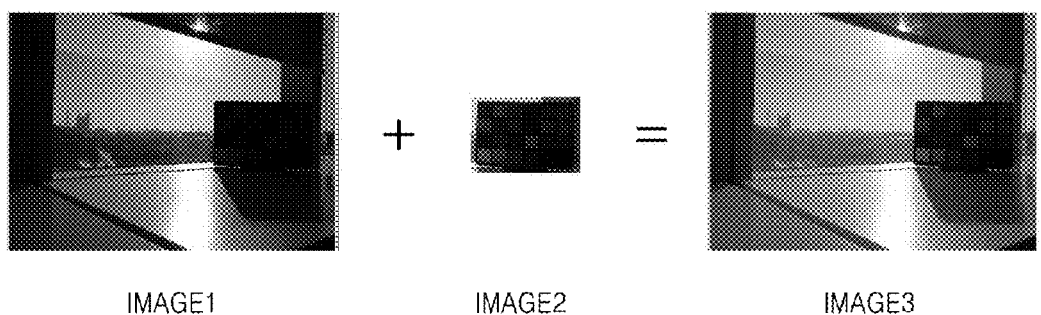
FIG. 9 is an image generated by the image sensor illustrated in FIG. 7 by using the ramp signals illustrated in FIG. 8.

FIG. 9 is an image generated by the image sensor illustrated in FIG. 7 using the ramp signals illustrated in FIG. 8.

Referring to FIGS. 1, 7, 8, and 9, the image signal processor 220 may generate a first image IMAGE1 based on the first digital signal DS1.

The image signal processor 220 may generate a second image IMAGE2 based on the second digital signal DS2. The image signal processor 220 may get the first image IMAGE1 in which a captured object is not seen well due to counterlight (or backlight), and the second image IMAGE2 in which only the captured object is seen.

The image signal processor 220 may generate a third image IMAGE3 having a wide dynamic range based on the first image IMAGE1 and the second image IMAGE2. The image sensor 100 may generate a noise-reduced third mixing signal MS3 based on the plurality of pixel signals G1S, G3S, G5S, and G7S output from two rows ROW1 and ROW3.

Accordingly, the image signal processor 220 may generate a third image IMAGE3 with an improved dynamic range from the digital signals DS1 and DS2 generated based on the third mixing signal MS3.

Figure 10:
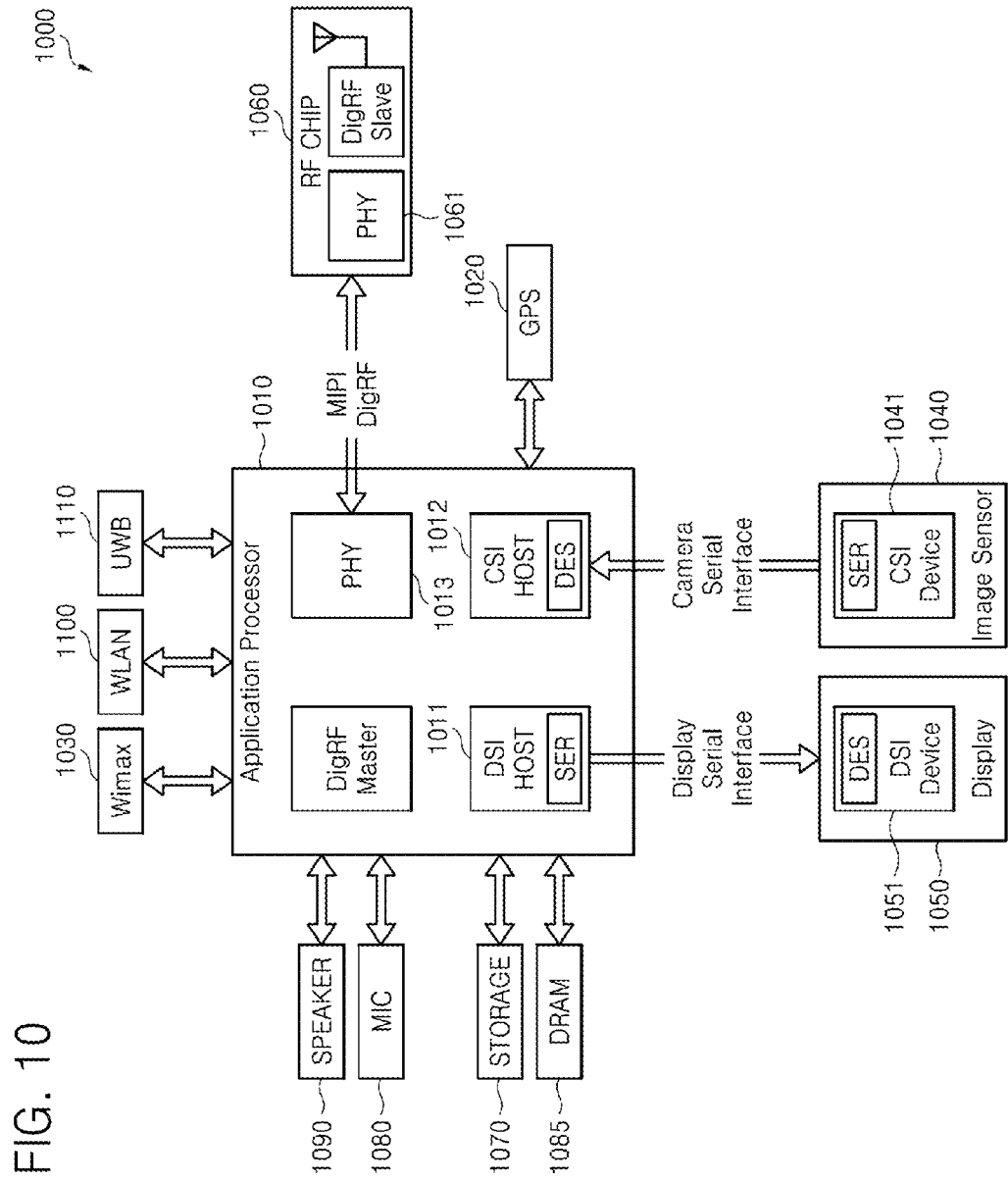
FIG. 10 is a schematic block diagram of another image sensing system including the image sensor according to an example embodiment of the present inventive concepts.

FIG. 10 is a schematic block diagram of another image sensing system including an image sensor according to an example embodiment of the present inventive concepts.

Referring to FIG. 10, an image sensing system 1000 may be embodied in a data processing device which may use or support a MIPI interface, e.g., a mobile phone, a personal digital assistant (PDA), a portable multimedia player (PMP), or a smart phone.

The image sensing system 1000 includes an application processor 1010, an image sensor 1040, and a display 1050. A CSI host 1012 embodied in the application processor 1010 may perform a serial communication with a CSI device 1041 of the image sensor 1040 through a camera serial interface (CSI).

Here, for example, a deserializer may be embodied in the CSI host 1012, and a serializer may be embodied in the CSI device 1041. The image sensor 1040 indicates the image sensor 100 described in FIGS. 1 to 7.

A DSI host 1011 embodied in the application processor 1010 may perform a serial communication with a DSI device 1051 of the display 1050 through a display serial interface (DSI). Here, for example, a serializer may be embodied in the DSI host 1011, and a deserializer may be embodied in the DSI device 1051.

The image sensing system 1000 may further include a RF chip 1060 which may communicate with the application processor 1010. A PHY (physical layer) 1013 of the image sensing system 1000 may transmit or receive data with a PHY 1061 of the RF chip 1060 through MIPI DigRF.

The image sensing system 1000 may further include a GPS receiver 1020, a storage 1070, a microphone 1080, a dynamic random access memory (DRAM) 1085, and a speaker 1090. The image sensing system 1000 may communicate using Wimax 1030, a wireless local area network (WLAN) 1100, and a ultra-wideband (UWB) 1110.

An image sensor according to an example embodiment of the present inventive concepts may read two rows, support a high frame rate while minimizing an increase in size of an analog-to-digital converter by connecting a column pair with an analog-to-digital converter pair, and generate an image with less noise.

While the example embodiments has been particularly shown and described with reference to example embodiments thereof, it will be understood by those of ordinary skill in the art that various changes in forms and details may be made therein without departing from the spirit and scope of the present inventive concepts as defined by the following claims.

What is claimed is:

1. An image sensor comprising:
   a first column pair and a second column pair among a plurality of columns of a pixel array;
   an analog-to-digital converter pair; and
   a switch arrangement circuit configured to connect the first column pair with the analog-to-digital converter pair and disconnect the second column pair from the analog-to-digital converter pair in response to first switch control signals such that two rows associated with the first column pair among a plurality of rows in the pixel array are read during a single access time.

2. The image sensor of claim 1, wherein the switch arrangement circuit comprises:
   a first capacitor pair corresponding to the first column pair;
   a second capacitor pair corresponding to the second column pair; and
   a switch arrangement configured to connect capacitors of the first capacitor pair such that the capacitors share a charge therebetween and the switch arrangement is configured to connect capacitors of the second capacitor pair such that the capacitors share a charge therebetween in response to the first switch control signals.

3. The image sensor of claim 1, wherein the switch arrangement circuit comprises:
   a first capacitor corresponding to the first column pair;
   a second capacitor corresponding to the second column pair; and
   a switch arrangement configured to connect one column of the first column pair to the first capacitor and the switch arrangement is configured to another column of the first column pair to the second capacitor in response to the first switch control signals.

4. The image sensor of claim 1, wherein the switch arrangement circuit is configured to connect one column of the first column pair with one column of the second column pair, and the switch arrangement is configured to simultaneously connect another column of the first column pair with another column of the second column pair in response to second switch control signals.

5. The image sensor of claim 4, wherein the switch arrangement circuit comprises:
   a first capacitor pair corresponding to the first column pair;

a second capacitor pair corresponding to the second column pair; and a switch arrangement configured to connect the one column of the first column pair with the one column of the second column pair in series through the first capacitor pair, and the switch arrangement is configured to connect the another column of the first column pair with the another column of the second column pair in series through the second capacitor pair in response to the second switch control signals.

6. The image sensor of claim 4, wherein the switch arrangement circuit comprises:

a first capacitor corresponding to the first column pair;
a second capacitor corresponding to the second column pair; and
a switch arrangement configured to,
   connect one column of the first column pair and one column of the second column pair with one analog-to-digital converter of the analog-to-digital converter pair through the first capacitor, and
   connect another column of the first column pair and another column of the second column pair with another analog-to-digital converter of the analog-to-digital converter pair in response to the second switch control signals.

7. The image sensor of claim 1, further comprising:

a ramp signal generator generating a first ramp signal and a second ramp signal, wherein
one analog-to-digital converter of the analog-to-digital converter pair is configured to generate a first digital signal based on the first ramp signal and a signal output from the switch arrangement circuit, and
another analog-to-digital converter of the analog-to-digital converter pair is configured to generate a second digital signal based on the second ramp signal and the signal output from the switch arrangement circuit.

8. The image sensor of claim 7, the first ramp signal and the second ramp signal differ in a sampling period by an offset.

9. The image sensor of claim 7, wherein a variation in a level of the first ramp signal with respect to time is different from a variation with respect to time in a level of the second ramp signal in a sampling period.

10. An image sensing system comprising:

an image sensor including,
   a pixel array including a plurality of rows and a plurality of columns, the image sensor configured to read two rows among a plurality of rows,
   a first column pair and a second column pair among the plurality of columns,
   an analog-to-digital converter pair, and
   a switch arrangement circuit configured to connect the first column pair with the analog-to-digital converter pair and disconnect the second column pair from the analog-to-digital converter pair in response to first switch control signals such that the two rows associated with the first column pair are read during a single access time; and
a processor configured to control an operation of the image sensor.

11. The image sensing system of claim 10, wherein switch arrangement circuit includes:

a first capacitor pair corresponding to the first column pair;
a second capacitor pair corresponding to the second column pair; and
a switch arrangement configured to connect capacitors of the first capacitor pair such that the capacitors share a charge therebetween and the switch arrangement is configured to connect capacitors of the second capacitor pair such that the capacitors share a charge therebetween in response to the first switch control signals.

12. The image sensing system of claim 10, wherein the switch arrangement circuit includes:

a first capacitor corresponding to the first column pair;
a second capacitor corresponding to the second column pair; and
a switch arrangement configured to,
   connect one column of the first column pair to the first capacitor in response to the first switch control signals, and
   connect another column of the first column pair to the second capacitor in response to the first switch control signals.

13. The image sensing system of claim 10, wherein the switch arrangement circuit is configured to connect one column of the first column pair with one column of the second column pair, and the switch arrangement circuit is configured to simultaneously connect another column of the first column pair with another column of the second column pair in response to second switch control signals.

14. The image sensing system of claim 13, wherein the switch arrangement circuit includes:

a first capacitor pair corresponding to the first column pair;
a second capacitor pair corresponding to the second column pair; and
a switch arrangement configured to,
   connect the one column of the first column pair and the one column of the second column pair in series through the first capacitor pair in response to the second switching control signals, and
   connect the another column of the first column pair and the another column of the second column pair in series through the second capacitor pair in response to the second switching control signals.

15. The image sensing system of claim 13, wherein the switch arrangement circuit includes:

a first capacitor corresponding to the first column pair;
a second capacitor corresponding to the second column pair; and
a switch arrangement configured to,
   connect one column of the first column pair and one of the second column pair with one analog-to-digital converter of the analog-to-digital converter pair through the first capacitor, and
   connect another column of the first column pair and another column of the second column pair with another analog-to-digital converter of the analog-to-digital converter pair through the second capacitor.

16. An image sensor comprising:

a column driver configured to connect pairs of column lines to analog-to-digital converters in response to switch control signals such that a first pair of the pairs of column lines are connected to the analog-to-digital converters and a second pair of the pairs of column lines are disconnected from the analog-to-digital converters in response to first switch control signals; and
a pixel array configured to supply each column line of the pairs of column lines with pixel signals from at least two rows simultaneously in response to row selection signals.

17. The image sensor of claim 16, wherein the column driver further comprises:

a first pair of capacitors connected between the first pair of the pairs of column lines and the analog-to-digital converters; and a second pair of capacitors connected between the second pair of the pairs of column lines and the analog-to-digital converters.

18. The image sensor of claim 17, wherein, in response to the first switch control signals, the column driver is further configured to,
connect the first pair of capacitors to a first column line of the first pair of the pairs of column lines such that the first pair of capacitors share a charge therebetween; and
connect the second pair of capacitors to a second column line of the first pair of the pairs of column lines such that the second pair of capacitors share a charge therebetween.

19. The image sensor of claim 17, wherein, in response to second switch control signals, the column driver is further configured to generate a mixing signal by,
connecting a first column line of Hail the first pair of the pairs of column lines with a first column line of the second pair of the pairs of column lines in series through the first pair of capacitors; and
connecting a second column line of the first pair of column lines with a second column line of the second pair of the pairs of column lines in series through the second pair of capacitors.

20. The image sensor of claim 18, wherein, a first one of the analog-to-digital converters is configured to generate a first digital signal based on a first ramp signal and the mixing signal,
a second one of the analog-to-digital converters is configured to generate a second digital signal based on a second ramp signal and the mixing signal, and
a variation in the first ramp signal over a sampling period differs from a variation in the second ramp signal over the sampling period.

* * * * *